(12) United States Patent
Wang

(10) Patent No.: US 8,140,510 B2
(45) Date of Patent: *Mar. 20, 2012

(54) SYSTEM AND METHOD FOR HANDLING ITEM LISTINGS WITH GENERIC ATTRIBUTES

(75) Inventor: Hsiaozhang Bill Wang, San Jose, CA (US)

(73) Assignee: eBay Inc., San Jose, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/416,088

(22) Filed: Mar. 31, 2009

(65) Prior Publication Data

US 2009/0187565 A1  Jul. 23, 2009

Related U.S. Application Data

(63) Continuation of application No. 11/558,291, filed on Nov. 9, 2006, now Pat. No. 7,536,402, which is a continuation of application No. 10/600,861, filed on Jun. 19, 2003, now Pat. No. 7,136,863, which is a continuation of application No. 09/563,069, filed on Apr. 24, 2000, now Pat. No. 6,604,107.

(51) Int. Cl.
  *G06F 17/30* (2006.01)
  *G06F 7/00* (2006.01)
(52) U.S. Cl. .................................... 707/706; 707/802
(58) Field of Classification Search ........... 707/999.101, 707/102, 3, 706, 802
  See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,811,199 A | 3/1989 | Kuechler et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |

(Continued)

FOREIGN PATENT DOCUMENTS

CA  2253543 A1  3/1997

(Continued)

OTHER PUBLICATIONS

"U.S. Appl. No. 09/563,069, Advisory Action mailed Oct. 24, 2002", 3 pgs.

(Continued)

*Primary Examiner* — Uyen Le

(74) *Attorney, Agent, or Firm* — Schwegman, Lundberg & Woessner, P.A.

(57) ABSTRACT

A system for storing a plurality of items across different categories in a database including a database that stores a data structure that has item entries for items of different categories. Each item entry includes one or more associated attributes. The attributes may be shared by multiple items across more than one category.

20 Claims, 10 Drawing Sheets

U.S. PATENT DOCUMENTS

| | | |
|---|---|---|
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,339,391 A | 8/1994 | Wroblewski et al. |
| 5,375,055 A | 12/1994 | Togher et al. |
| 5,394,324 A | 2/1995 | Clearwater |
| 5,426,281 A | 6/1995 | Abecassis |
| 5,479,600 A | 12/1995 | Wroblewski et al. |
| 5,485,510 A | 1/1996 | Colbert |
| 5,544,051 A | 8/1996 | Senn et al. |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,600,833 A | 2/1997 | Senn et al. |
| 5,627,979 A | 5/1997 | Chang et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,724,593 A | 3/1998 | Hargrave, III et al. |
| 5,727,165 A | 3/1998 | Ordish et al. |
| 5,758,333 A | 5/1998 | Bauer et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,826,258 A | 10/1998 | Gupta |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,857,188 A | 1/1999 | Douglas |
| 5,857,201 A | 1/1999 | Wright et al. |
| 5,857,203 A | 1/1999 | Kauffman et al. |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,909,544 A | 6/1999 | Anderson et al. |
| 5,922,074 A | 7/1999 | Richard et al. |
| 5,924,072 A | 7/1999 | Havens |
| 5,926,794 A | 7/1999 | Fethe |
| 5,944,790 A | 8/1999 | Levy |
| 5,974,412 A | 10/1999 | Hazlehurst et al. |
| 5,991,739 A | 11/1999 | Cupps et al. |
| 6,006,221 A | 12/1999 | Liddy et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,119,229 A | 9/2000 | Martinez et al. |
| 6,161,082 A | 12/2000 | Goldberg et al. |
| 6,178,408 B1 | 1/2001 | Copple et al. |
| 6,189,003 B1 | 2/2001 | Leal |
| 6,192,407 B1 | 2/2001 | Smith et al. |
| 6,202,051 B1 | 3/2001 | Woolston |
| 6,243,691 B1 | 6/2001 | Fisher et al. |
| 6,266,651 B1 | 7/2001 | Woolston |
| 6,266,652 B1 | 7/2001 | Godin et al. |
| 6,363,337 B1 | 3/2002 | Amith |
| 6,526,426 B1 | 2/2003 | Lakritz |
| 6,574,239 B1 | 6/2003 | Dowling et al. |
| 6,598,026 B1 | 7/2003 | Ojha et al. |
| 6,604,107 B1 | 8/2003 | Wang |
| 6,778,993 B2 | 8/2004 | Wang |
| 6,901,408 B2 | 5/2005 | Fachat et al. |
| 6,999,932 B1 | 2/2006 | Zhou |
| 7,013,289 B2 | 3/2006 | Horn et al. |
| 7,136,863 B2 | 11/2006 | Wang |
| 7,418,390 B1 | 8/2008 | Jokipii |
| 7,536,402 B2 | 5/2009 | Wang |
| 2001/0029455 A1 | 10/2001 | Chin et al. |
| 2002/0069049 A1 | 6/2002 | Turner |
| 2003/0011608 A1 | 1/2003 | Wada |
| 2003/0018885 A1 | 1/2003 | Landsman et al. |
| 2005/0240392 A1 | 10/2005 | Munro et al. |
| 2007/0088722 A1 | 4/2007 | Wang |

FOREIGN PATENT DOCUMENTS

| | | |
|---|---|---|
| FR | 2658635 | 8/1991 |
| JP | 2002207898 A | 7/2002 |
| NL | 9300266 | 2/1993 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |
| WO | WO-0058862 A2 | 10/2000 |
| WO | WO-0078557 A1 | 12/2000 |
| WO | WO-0182107 A1 | 11/2001 |
| WO | WO-0182115 A1 | 11/2001 |
| WO | WO-03038560 A2 | 5/2003 |

OTHER PUBLICATIONS

"U.S. Appl. No. 09/563,069, Examiner Interview Summary mailed Aug. 12, 2002", 2 pgs.

"U.S. Appl. No. 09/563,069, Final Office Action mailed Jun. 4, 2002", 11 pgs.

"U.S. Appl. No. 09/563,069, Non Final Office Action mailed Nov. 21, 2001", 23 pgs.

"U.S. Appl. No. 09/563,069, Notice of Allowance mailed Jan. 28, 2003", 7 pgs.

"U.S. Appl. No. 09/563,069, Response filed Jan. 16, 2002 to Non Final Office Action mailed Nov. 21, 2001", 23 pgs.

"U.S. Appl. No. 09/563,069, Response filed Oct. 4, 2002 to Final Office Action mailed Jun. 4, 2002", 15 pgs.

"U.S. Appl. No. 10/319,034, 312 Amendment filed Jun. 25, 2004", 3 pgs.

"U.S. Appl. No. 10/319,034, Notice of Allowance mailed Apr. 6, 2004", 7 pgs.

"U.S. Appl. No. 10/600,861, Final Office Action mailed Jan. 12, 2006", 6 pgs.

"U.S. Appl. No. 10/600,861, Non Final Office Action mailed May 17, 2005", 6 pgs.

"U.S. Appl. No. 10/600,861, Non Final Office Action mailed Aug. 16, 2004", 6 pgs.

"U.S. Appl. No. 10/600,861, Notice of Allowance mailed Jun. 29, 2006", 4 pgs.

"U.S. Appl. No. 10/600,861, Response filed Jun. 12, 2006 to Final Office Action mailed Jan. 12, 2006", 8 pgs.

"U.S. Appl. No. 10/600,861, Response filed Aug. 17, 2005 to Non Final Office Action mailed May 17, 2005", 8 pgs.

"U.S. Appl. No. 10/600,861, Response filed Dec. 16, 2004 to Non Final Office Action mailed Aug. 16, 2004", 8 pgs.

"U.S. Appl. No. 10/831,421, Final Office Action mailed Jun. 13, 2008", 18 pgs.

"U.S. Appl. No. 10/831,421, Final Office Action mailed Jul. 9, 2009", 18 pgs.

"U.S. Appl. No. 10/831,421, Final Office Action mailed Sep. 7, 2010", 20 pgs.

"U.S. Appl. No. 10/831,421, Non Final Office Action mailed Mar. 14, 2011", 21 pgs.

"U.S. Appl. No. 10/831,421, Non-Final Office Action mailed Jan. 12, 2009", 16 pgs.

"U.S. Appl. No. 10/831,421, Non-Final Office Action mailed Mar. 5, 2010", 20 pgs.

"U.S. Appl. No. 10/831,421, Non-Final Office Action mailed Nov. 28, 2007", 12 pgs.

"U.S. Appl. No. 10/831,421, Response filed Jan. 11, 2010 to Final Office Action mailed Jul. 9, 2009", 6 pgs.

"U.S. Appl. No. 10/831,421, Response filed Feb. 28, 2008 to Non-Final Office Action mailed Nov. 28, 2007", 23 pgs.

"U.S. Appl. No. 10/831,421, Response filed Apr. 13, 2009 to Non Final Office Action mailed Jan. 12, 2009", 18 pgs.

"U.S. Appl. No. 10/831,421, Response filed Jul. 6, 2010 to Non Final Office Action mailed Mar. 5, 2010", 7 pgs.

"U.S. Appl. No. 10/831,421, Response filed Oct. 10, 2008 to Final Office Action mailed Jun. 13, 2008", 20 pgs.

"U.S. Appl. No. 10/831,421, Response filed Nov. 29, 2010 to Final Office Action mailed Sep. 7, 2010", 8 pgs.

"U.S. Appl. No. 10/831,421, Response filed Jun. 14, 2011 to Non Final Office Action mailed Mar. 14, 2011", 7 pgs.

"U.S. Appl. No. 11/558,291, Non-Final Office Action mailed Jul. 28, 2008", 14 pgs.

"U.S. Appl. No. 11/558,291, Notice of Allowance mailed Jan. 6, 2009", 12 pgs.

"U.S. Appl. No. 11/558,291, Response filed Oct. 29, 2008 to Non Final Office Action mailed Jul. 28, 2008", 9 pgs.

"International Application Serial No. PCT/US00/17136 International Search Report mailed Nov. 16, 2000", 6 pgs.

"International Application Serial No. PCT/US00/32088, International Search Report mailed Apr. 4, 2001", 6 pgs.

"International Application Serial No. PCT/US01/02584, International Search Report mailed Apr. 16, 2001", 4 pgs.

"International Application Serial No. PCT/US01/04811, International Search Report mailed Jun. 28, 2001", 6 pgs.

"International Application Serial No. PCT/US01/12398 International Search Report mailed Aug. 27, 2001", 3 pgs.

"International Application Serial No. PCT/US01/13253, International Search Report mailed Jul. 31, 2001", 1 pg.

"International Application Serial No. PCT/US01/23854, International Search Report mailed Dec. 28, 2001", 6 pgs.

"International Application Serial No. PCT/US02/04692, International Search Report mailed Jun. 12, 2002", 5 pgs.

"International Application Serial No. PCT/US99/18510, International Search Report mailed Oct. 29, 1999", 4 pgs.

"International Application Serial No. PCT/US99/29312, International Search Report mailed Apr. 18, 2000", 6 pgs.

"Onsale Joins Fray as Online Shopping Picks Up Speed: Internet Booms", Computer Reseller News, CMP Publications, Inc., USA, (Jun. 5, 1995), 1 pg.

"Onsale: Onsale Brings Thrill of Auctions and Bargain Hunting Online; Unique Internet retail service debuts with week-long charity auction for The Computer Museum in Boston", Business Wire, Dialog Web. 0489267 BW0022, (May 24, 1995), 3 pages.

"Yahoo! Auctions Celebrates One-Year Anniversary; As Online Auction Usage Continues to Grow, Yahoo! Is Quickly Becoming the World Marketplace of the New Millennium", Business Wire, (Sep. 14, 1999), 3 pages.

Akin, David, "Web retailing gains market muscle as concerns fade: Record season: Increasing number of sites catering for Canadian dollars", Financial Post, p04, XP002905105, (Dec. 26, 1998), 3 pages.

Andale.com, "Andale Lister", [Online]. [Archived Oct. 25, 2002]. Retrieved from the Internet: <URL:http://web.archive.org/web/20021025121452/http://www.andale.com/corp/products/sell.jsp>, 3 pgs.

Andale.com, "Andale Lister: Bulk List", [Online]. [Archived Oct. 5, 2002]. Retrieved from the Internet: <URL:http://web.archive.org/web/20021005074745/http://www.andale.com/corp/products/qs_sell_details_bulklist.jsp>, 1 pg.

Andale.com, "Andale lister: Design Center", [Online]. [Archived Dec. 15, 2004]. Retrieved from the Internet: <URL:http://web.archive.org/web/20021215192044/http://www.andale.com/corp/products/qs_sell_details_designcenter.jsp>, 1 pg.

Andale.com, "Andale Lister: In-Line Images", [Online]. [Archived Dec. 15, 2002]. Retrieved from the Internet: <URL:http://web.archive.org/web/20021215192408/http://www.andale.com/corp/products/qs_sell_details_inlineimg.jsp>, 1 pg.

Andale.com, "Andale Lister: Inventory Dashboard", [Online]. [Archived Dec. 15, 2002]. Retrieved from the Internet: <URL:http://web.archive.org/web/20021215192408/http://www.andale.com/corp/products/qs_sell_details_invdashboard.jsp, 2 pgs.

Andale.com, "Andale Lister: Launch Scheduler", [Online]. [Archived Dec. 15, 2002]. Retrieved from the Internet: <URL:http://web.archive.org/web/20021215192724/http://www.andale.com/corp/products/qs_sell_details_launchsched.jsp, 1 pg.

Andale.com, "Andale Lister: Online or Offline", [Online]. [Archived Dec. 15, 2002]. Retrieved from the Internet: <URL:http://web.archive.org/web/20021215194722/http://www.andale.com/corp/products/qs_sell_details_onoffline.jsp>, 2 pgs.

Andale.com, "Andale Lister: Overview", [Online]. [Archived Dec. 1, 2002]. Retrieved from the Internet: <URL:http://web.archive.org/web/20021201081906/http://www.andale.com/corp/products/qs_overview.jsp, 4 pgs.

Baumann, G. W, "Personal Optimized Decision/Transaction Program", IBM Technical Disclosure Bulletin,, (Jan. 1995), 83-84.

Business Wire, "Mediappraise Receives National Award for Web-based Technology That Enables Companies to Solve Thorny HR Problem", Business Wire, (Dec. 14, 1998), 1-2.

Business Wire, "Subasta.com Enters Into Strategic Partnership with From2.com", Business Wire, Obtained from Proquest, Document No. 43206061, (Jul. 16, 1999), 2 pages.

Business Wire, "Subasta.com, the Premier Online Auction Board for Latin America, Spain, and the Hispanic Sector of the U.S., Has Attracted Over 60,000 Viewers in Less Than Two Months!", Business Wire, (Jul. 16, 1999), 2 pages.

Clemons, E, "Evaluating the prospects for alternative electronic securities", Proceedings of ICIS 91: 12th International Conference on Information Systems, (Dec. 16-18, 1991), 53-61.

Graham, I, "The Emergence of Linked Fish Markets in Europe", Focus Theme, 1-4.

Hauser, R, "Anonymous Delivery of Goods in Electronic Commerce", IBM Technical Disclosure Bulletin, 39(3), (Mar. 1996), 363-366.

Hess, C M, et al., "Computerized Loan Organization System: An Industry Case Study of the Electronic Markets Hypothesis", MIS Quarterly, vol. 18(3), (Sep. 1994), 251-274.

Klein, Stefan, "Introduction to Electronic Auctions", Focus Theme, vol. 7, No. 4, (1997), 1-4.

Lee, H. G, "Electronic brokerage and electronic auction: the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", M2 Presswire, (Mar. 22, 2000), 2 pages.

Malone, T., et al., "Electronic Markets and Electronic Hierarchies", Communications of the ACM, 14(25), (Jun. 1987), 484-497.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

Meade, J., "Visual 360: A Performance Appraisal System That's 'Fun'", HR Magazine, Society for Human Resource Management., (Jul. 1999), 3 pgs.

Neo, B S, "The implementation of an electronic market for pig trading in Singapore", Journal of Strategic Information Systems; vol. 1(5), (Dec. 1992), 278-288.

Post, D L, et al., "Application of auctions as a pricing mechanism for the interchange of electric power", IEEE Transactions on Power Systems, 10(3), (Aug. 1995), 1580-1584.

Preist, Chris, et al., "Adaptive Agents in a Persistent Shout Double Auction", International Conference on Information and Computation Economies, Proceedings of the first international conference on Information and computation economies, (1999), 11-18.

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rockoff, T E, et al., "Design of an Internet-based system for remote Dutch auctions", Internet Research: Electronic Networking Applications and Policy, vol. 5(4), (Jan. 1, 1995), 10-16.

Schmid, B F, "The Development of Electronic Commerce", EM—Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Tjostheim, Ingvar, et al., "A case study of an on-line auction for the World Wide Web", Norwegian Computing Center (NR) http://www.nr.no/~ingvar/enter98.html, 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, 6 pgs.

Warbelow, A, et al., "Aucnet: TV Auction Network System", Harvard Business School Case/Study, HBVR#9-190-001, USA, (Jul. 1989), 1-15.

Zwass, V., "Electronic Commerce: Structures and Issues", International Journal of Electronic Commerce, Fall 1996, vol. 1, No. 1, (Fall 1996), 3-23.

| GENERIC ATTRIBUTE TABLE | | | |
|---|---|---|---|
| SITE ID | ATTRIBUTE ID | ATTRIBUTE NAME | ATTRIBUTE TYPE |
| 301 | 303 | 305 | 307 |

| ATTRIBUTE VALIDITY TABLE | | | | | |
|---|---|---|---|---|---|
| SITE ID | ATTRIBUTE ID | VALID VALUE ID | VALID VALUE | MAXIMUM RANGE | MINIMUM RANGE |
| 401 | 404 | 406 | 408 | 410 | 412 |

204

| ATTRIBUTE MAP TABLE | | | | | | |
|---|---|---|---|---|---|---|
| SITE ID | CATEGORY ID | ATTRIBUTE POSITION | ATTRIBUTE ID | DISPLAY POSITION | DISPLAY LENGTH | SEARCH FLAG |
| 602 | 604 | 606 | 608 | 610 | 612 | 614 |

| MAKE MODEL | MILEAGE | YEAR | PRICE | BIDS | ENDS PST |
|---|---|---|---|---|---|
| FORD EXPEDITION | 800 miles | 2000 | $35,000 | | |
| HONDA ACCORD | 750 miles | 2000 | $18,000 | | |
| SATURN SC1 | 400 miles | 2000 | $17,500 | | |
| HONDA CIVIC | 900 miles | 2000 | $17,000 | | |
| 702 | 704 | 706 | 708 | | |

Fig. 7

SEARCH TITLE [    ]    SEARCH — 813
search tips

☐ search titles, descriptions and
vehicle characteristics
(use this to find more items)

---

CURRENT BID PRICE: Between  $ [        ] and

[        ]

VEHICLE MAKE: [    ▼] — 802

VEHICLE MODEL: [    ▼] — 804

VEHICLE YEAR: Between [Before 1950 ▼]—806 and [2001 ▼]—808

MILEAGE RANGE: [Less than 1000 miles ▼]—810

LOCATION: [All eBay- includes all regions ▼]—812

SYSTEM AND METHOD FOR HANDLING ITEM LISTINGS WITH GENERIC ATTRIBUTES

RELATED APPLICATIONS

The present application is a continuation of Ser. No. 11/558,291, filed Nov. 9, 2006, now U.S. Pat. No. 7,536,402 which issued May 19, 2009, which is a continuation of U.S. Pat. No. 7,136,863, which issued Nov. 14, 2006, which is a continuation of 09/563,069, filed Apr. 24, 2000, now U.S. Pat. No. 6,604,107, which issued Aug. 5, 2003. This application is also related to and claims priority to U.S. Pat. No. 6,778,993 which issued Aug. 17, 2004. These patents are incorporated herein by reference in their entirety.

FIELD OF THE INVENTION

The invention relates to databases. More specifically, the invention relates to a system and method for providing generic attributes across multiple categories in such databases.

BACKGROUND OF THE INVENTION

With the advent of the computer industry, databases have played an important role in order to store the vast amounts of information employed in such an industry. Different types of databases have been developed depending on the type of information, size, application as well as other factors.

Currently, one type of database is employed for the storage of different types of categories having specific attributes. One application of such a database is used in conjunction with an Internet-based auction facility of different consumer products and services. For the storage of e-commerce goods or consumer product and/or service information into a database, each type of product (e.g., automobiles, shoes, etc.) will have its own category. Typically, in such databases, each category is stored in a separate data structure (e.g., a table), wherein such data structures will include the specific attributes for that category. For example, for a shoes category, the attributes could include (1) color, (2) size, and (3) type of material. Accordingly, a data structure is created that includes these attributes. Similarly, for an automobile category, the attributes could include (1) make, (2) model, (3) year and (4) color. Therefore, a separate data structure is created for these attributes.

Disadvantageously, this type of database wherein a table is allocated for each type of category makes the design, the implementation, the testing, as well as the management of such a system very difficult. Accordingly, there is a need for an improved database system that is able to store vast amounts of information across a number of different categories, while being easier to design, implement, test and manage in comparison to the conventional database systems.

BRIEF DESCRIPTION OF THE DRAWINGS

Embodiments of the invention may be best understood by referring to the following description and accompanying drawings which illustrate such embodiments. In the drawings:

FIG. 3 is a data structure stored in a database according to embodiments of the present invention.

FIG. 4 is another data structure stored in a database according to embodiments of the present invention.

FIG. 7 is an output window presenting information outputted from a database according to embodiments of the present invention.

FIG. 8 is an input window to receive information to be inputted into a database according to embodiments of the present invention.

DETAILED DESCRIPTION

A method and system for storing multiple items across different categories in a database are described. In the following description, for purposes of explanation, numerous specific details are set forth in order to provide a thorough understanding of the present invention. It will be evident, however, to one skilled in the art that the present invention may be practiced without these specific details.

Transaction Facility

Figure 1:
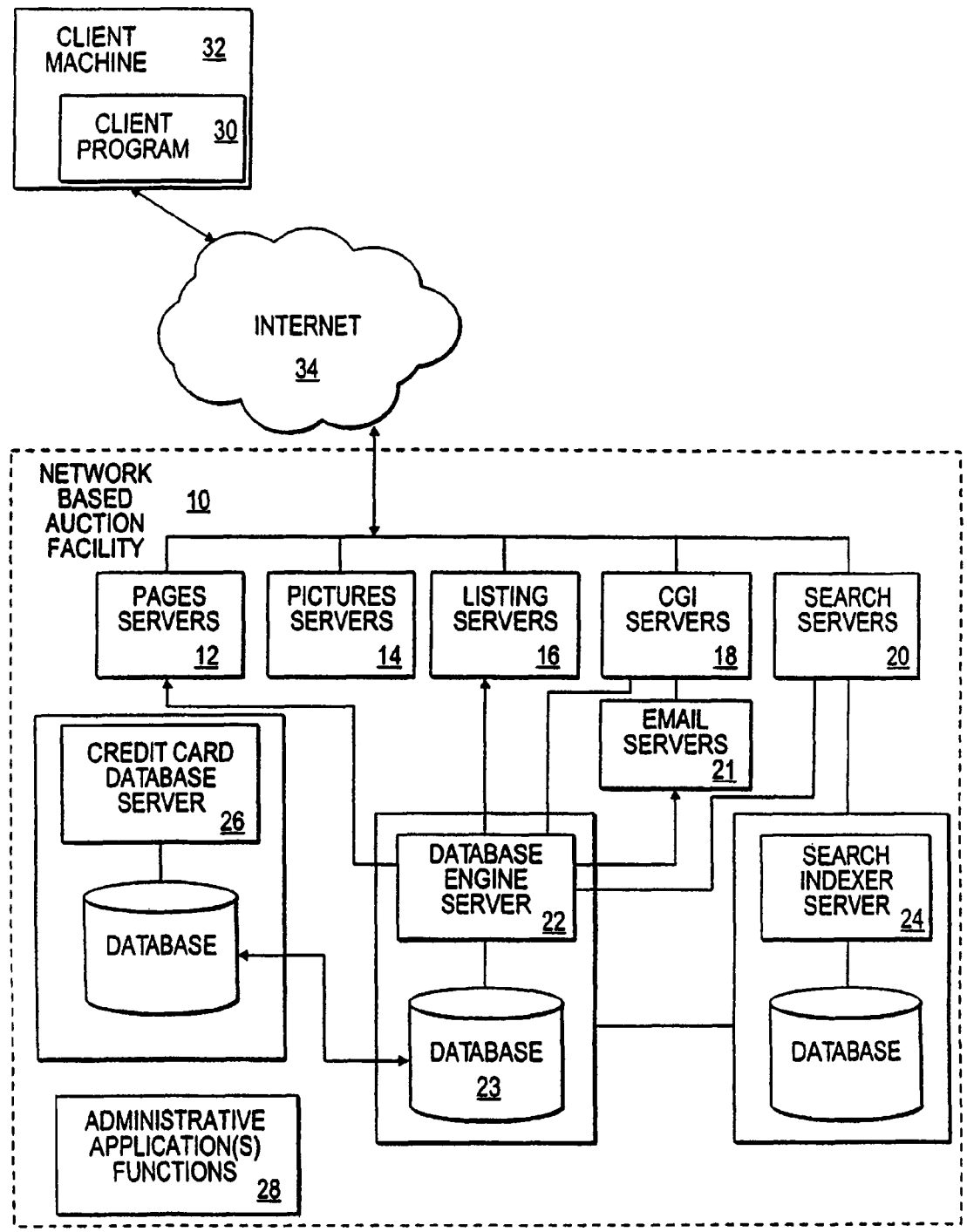
FIG. 1 is a block diagram illustrating an exemplary network-based transaction facility according to embodiments of the present invention.

FIG. 1 is block diagram illustrating an exemplary network-based transaction facility in the form of an Internet-based auction facility 10 that incorporates embodiments of the present invention. While an exemplary embodiment of the present invention is described within the context of an auction facility, it will be appreciated by those skilled in the art that the invention will find application in many different types of computer-based, and network-based facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
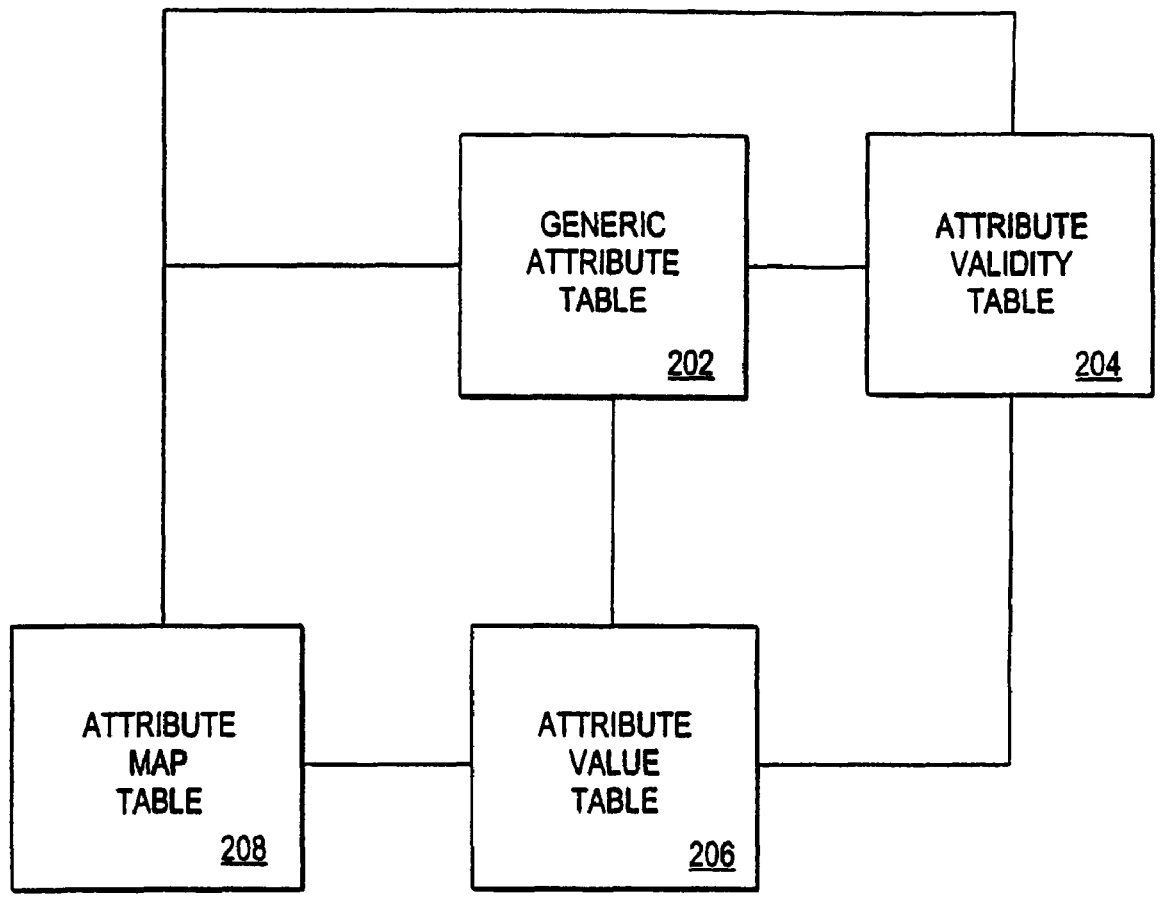
FIG. 2 is a database according to embodiments of the present invention.

FIG. 2 is a database diagram illustrating an exemplary database 23, maintained by and accessed via the database engine server 22, which at least partially implements and supports the auction facility 10. In one embodiment, the database 23 is implemented as a relational database and includes a number of tables having entries or records that are linked by indices and keys.

Database 23 includes generic attribute table 202, attribute validity table 204, attribute value table 206 and attribute map table 208. Generic attribute table 202 is a data structure that includes and defines all the attributes across all the different items of the different categories included in database 23. For example, in one embodiment, database 23 is used in conjunction with the tracking of different e-commerce goods or consumer products (e.g., automobiles, shoes) and/or services. Accordingly, these different categories have attributes that are different as well as attributes that are the same. For example, the categories of shoes and automobiles both may have a color attribute. In contrast, the category of automobiles may have a year attribute, indicating the year of the automobile, while the category of shoes may not have this attribute.

FIG. 3 is a diagrammatic representation of an exemplary embodiment of generic attribute table 202 that is populated with records or entries for attributes for different categories of items (e.g., consumer products and/or services) used in conjunction with auction facility 10. Generic attribute table 202 includes site identification (ID) column 301 that stores the site (e.g., country) in which the item is being sold and/or is located. In one embodiment wherein the site is a non-English country, the attributes are stored and/or outputted in the native language (e.g., Japanese). Attribute ID column 303 is a unique identifier within database 23 for that particular attribute. In one embodiment, the attribute ID for a particular attribute is independent of the language, thereby allowing attributes, which are stored and/or outputted in different languages, to have the same attribute ID. For example, if a color attribute is stored in both English and Japanese, the site ID would be different but the attribute ID would be the same.

Moreover, the attribute ID can be the same across different categories within database 23 for those attributes that are the same. For example, a color attribute can be used in conjunction with both automobiles and shoes. Therefore, even though two separate categories include a "color" attribute, there is a need for only one entry into database 23. Accordingly, database 23 includes attributes that can be shared across different categories of products, thereby allowing for fewer numbers of tables to be designed, created and maintained than conventional databases wherein a table in such a database is designed, created and maintained for each category.

Self-defined, attribute name column 305 is the name of the attribute. Further, attribute type column 307 is the type defined for that attribute. In one embodiment the attribute types include multiple choice, Boolean, integer and float. Multiple-choice type is for those attributes that have discrete values associated therewith. For example, the attribute type for color is a multiple-choice type, as such a type can be different colors (e.g., blue, green or red). The "Boolean" attribute type is for those attributes that have one of two conditions. For example, air conditioning is a Boolean type, as the product (e.g., an automobile or house) either does or does not have air conditioning. Moreover, the integer and float could be incorporated into various categories including, for example, the year and the price of the item, respectively. However, embodiments of the invention are not limited to these attribute types, as other attribute types can be included in attribute type column 307.

FIG. 4 is a diagrammatic representation of an exemplary embodiment of attribute validity table 204 that is populated with records or entries for valid values for attributes for different categories of items (e.g., consumer products and/or services), as defined in generic attribute table 202, used in conjunction with auction facility 10. In one embodiment, attribute validity table 204 includes the valid values for attributes that have attribute types of multiple choice, integer and float. However, attribute validity table 204 is not so limited as any type of attribute that includes a range or list of valid values can be included in attribute validity table 204.

Attribute validity table 204 includes site ID column 402 that, as described above, stores the site (e.g., country) in which the item is being sold and/or is located. In one embodiment wherein the site is a country that is not English, the attributes are stored and/or outputted in the native language (e.g., Japanese). Additionally as described above, attribute ID column 404 stores a unique identifier within database 23 for that particular attribute.

Moreover, valid value ID column 406 stores a unique identification number for a valid value for a particular attribute. Valid value column 408 stores the valid values for the attributes defined in generic attribute table 202. Because there can be multiple valid values for a particular attribute, attribute validity table 204 can include different valid value IDs and valid values associated with one attribute. One example would be an attribute having a "multiple choice" attribute type. Assuming that the color attribute is a "multiple choice" type and that its attribute ID is one, this attribute ID will be the same for three valid value IDs (e.g., one for red, two for blue and three for green). Accordingly, attribute validity table 204 will have three different entries for these three color attributes, wherein the attribute ID and site ID for all three entries are the same, while the valid value ID and valid value are different for the attribute.

Maximum range column 410 and minimum range column 412 store the ranges of valid values for the attributes defined in generic attribute table 202 that are defined by a range. One such range would be the year of the product. Moreover because attributes are shared across different items in different categories, there can be multiple valid ranges for a particular attribute. Accordingly, attribute validity table 204 can include multiple entries having different maximum and minimum ranges for a particular attribute. For example, assuming that for the year attribute for items the attribute ID is three and that there are three valid ranges for this attribute (e.g., (1) 1930-1939, (2) 1940-1949 and (3) 1950-1959), the valid value ID will be different for all three different year ranges, while having a different entry into attribute validity table 204 for each one. Further, for these three entries, the site ID and the attribute ID remain constant. Accordingly, attribute validity table 204 includes valid values for attributes that can be shared across different categories of products, thereby allowing for fewer numbers of tables to be designed, created and maintained than conventional databases. Moreover in one embodiment valid value column 408 is mutually exclusive of maximum range column 410 and minimum range column 412. For example, if an attribute (e.g., color) is a multiple choice attribute type, this attribute is defined by discrete components (e.g., red, blue or green) and not by a range.

Figure 5:
FIG. 5 is another data structure stored in a database according to embodiments of the present invention.

FIG. 5 is a diagrammatic representation of an exemplary embodiment of attribute value table 206 that is populated with records or entries of attribute values of actual items (i.e., attribute value entries) stored in database 23 used in conjunction with auction facility 10. In one embodiment, the number of attributes for a particular item is limited to 30. However, embodiments of the present invention are not so limited, as an item can be have any number of attributes associated therewith.

Item ID column 502 is a unique identifier (i.e., an identification number) across database 23 for an item stored therein. For example, assuming that 10 different automobiles and 10 different pairs of shoes are stored in database 23, all 10 different automobiles and all 10 different pairs of shoes receive a unique identifier. Attributes #1-30 columns 504-508 define the values of the attributes, but not the attribute type (e.g., color), for a particular item that has a unique identifier. For example, one entry could include an item ID of 221264646, which has three different attributes: (1) attribute #1 is 1956, (2) attribute #2 is three and (3) attribute #3 is one.

Figure 6:
FIG. 6 is another data structure stored in a database according to embodiments of the present invention.

FIG. 6 is a diagrammatic representation of an exemplary embodiment of attribute map table 208 that is populated with records or entries for each attribute stored in attribute value table 206 (i.e., attribute map entries) that is used in conjunction with auction facility 10. These records or entries include mapping or translation values (i.e., attribute map values or translation components) for the attributes. In one embodiment, the mapping or translation values include the category and attribute types for the attribute value.

Attribute map table 208 includes site ID column 602 that, as described above, stores the site (e.g., country) in which the item is being sold and/or is located. Category ID column 604 stores the type of category (e.g., automobile or shoes) that the attribute is within. Attribute position column 606 stores the position within the category that the attribute is located. For example, assuming that the category includes three attributes: (1) color, (2) size and (3) type of material, the attribute position for size would be two. Attribute map table 208 also includes attribute ID column 608 and is defined as described above in conjunction with FIGS. 3-4.

Display position column 610 stores the column position within a display interface when the attribute is outputted on such an interface. One example of a display interface is shown in FIG. 7. In particular, FIG. 7 includes output display interface 700. In one embodiment, output display interface 700 is a markup language page interface displayed by a browser. However, it will be appreciated that the display interface could comprise user interfaces presented by any WINDOWS® client application or stand-alone application, and need not comprise markup-language documents.

Output display interface 700 is a display interface for an automobile category based on a search within database 23 for certain automobiles. Accordingly, columns 706-712 include the make-model, the mileage, the year and the price, respectively of different automobiles being displayed in output display interface 700. Assuming that for an attribute entry in attribute map table 208 that is being outputted to output display interface 700 the display position is three, the associated attribute (i.e., the year attribute) would be positioned at column 3 of output display interface 700.

Additionally, display length column 612 stores the number of characters being displayed in a display interface when the attribute is outputted on such an interface. Returning to output display interface 700, the display length for the year attribute would be four (one for each digit in the year).

Moreover, search flag column 614 stores a number, when translated, defines whether this attribute is searchable and assuming that the particular attribute is searchable, whether the particular attribute was used for searching in a retrieval process within database 23. When an attribute is considered searchable, any retrieval processes from database 23 can employ such an attribute. For example, if a user of database 23 desires to find all of the cars in database 23 that have the color attribute of "blue" and the color attribute is searchable, such a user can use this color attribute to search and retrieve all blue-colored colors from database 23.

Use and Operation of Transaction Facility

Figure 9:
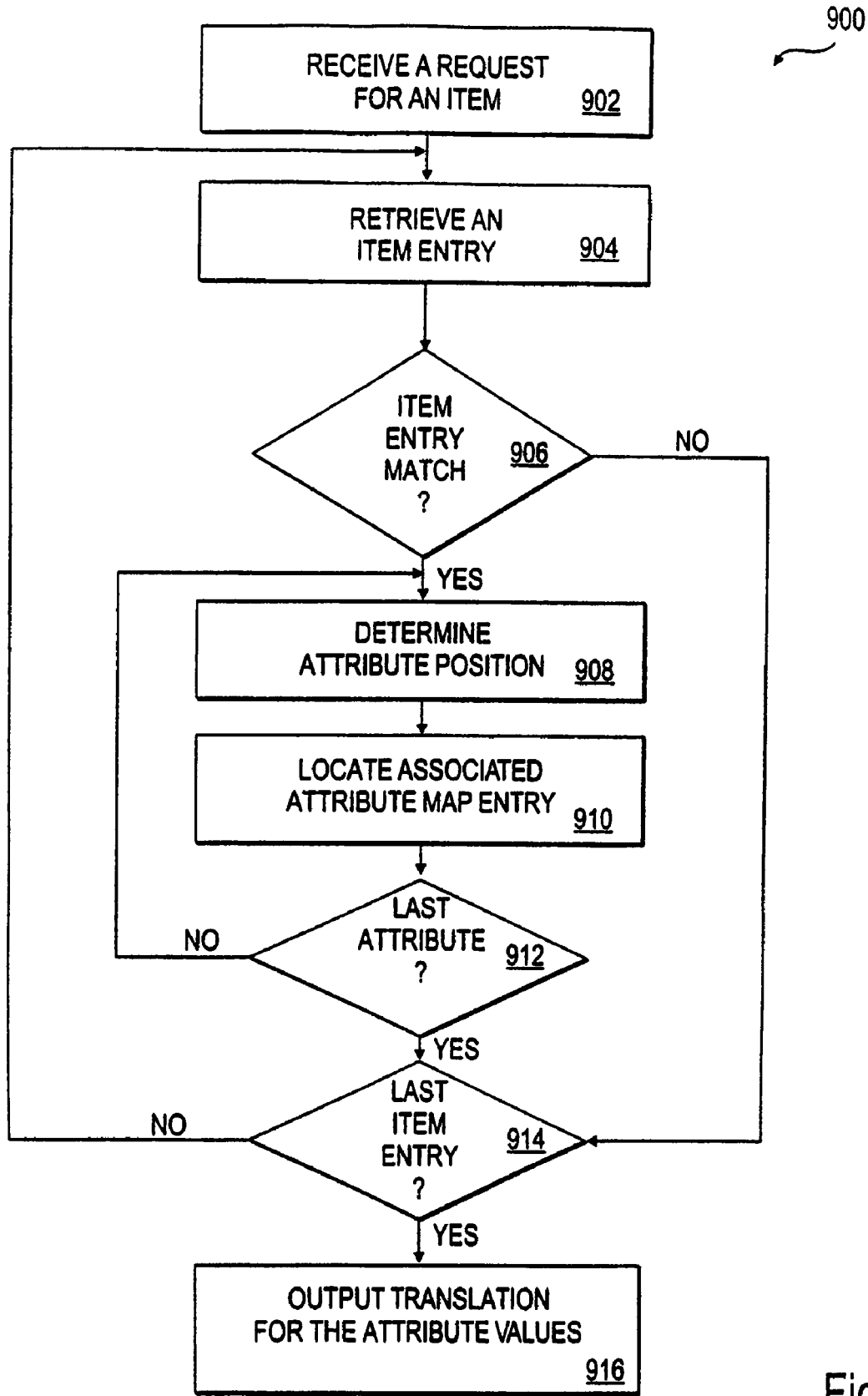
FIG. 9 is a flowchart for use and operation of a transaction facility according to embodiments of the present invention.

In conjunction with output display interface 700 of FIG. 7 and input display interface 800 of FIG. 8 for an automobile category, the use and operation of the auction facility 10 in accordance with embodiments of the present invention will be described with reference to flow chart shown in FIG. 9.

During the bidding process for auction items, a user of the auction facility 10 may desire to search for particular auction item for which to bid. Accordingly, the user is presented with input display interface 800 through which the user provides certain search criteria for searching for and retrieving items from database 23. In one embodiment, input display interface 800 is a markup language page interface displayed by a browser. However, it will be appreciated that the display interface could comprise user interfaces presented by any WINDOWS® client application or stand-alone application, and need not comprise markup-language documents.

Input display interface 800 for an automobile category provides make field 802 and model field 804 into which a user may enter the make and model of the automobiles. Input display interface 800 also includes minimum year range field 806 and maximum year range field 808 into which a user may enter the range of years of the automobiles. Moreover, input display interface 800 includes mileage range field 810 and location field 812 into which a user may enter the mileage and location of the automobiles. Once the users enter the information for all or some of these fields and presses search button 813, method 900 commences, at block 902, wherein search servers 20 receives a request for all automobiles in database 23 that include the attributes that the user entered in fields 802-812.

Search servers 20 forwards this search request to database engine server 22. At block 904, database engine server 22 retrieves an item entry from the attribute value table 206 and derives the site ID and the category ID. In particular, the site ID and the category ID are derived from the item ID in the item entry through a decoding or translation procedure, known in the art. At decision block 906, database engine server 22 checks to see if the site ID and the category ID match the requested site ID and category ID from the search request. If the site ID and the category ID do not match the requested site ID and category ID from the search request, database engine server 22, at decision block 914, determines if this is the last item entry in attribute value table 206, which is further described below.

If, at decision block 906, the site ID and the category ID do match the requested site ID and category ID from the search request, database engine server 22, at block 908, database engine server 22 determines the attribute position of the first attribute based on its location in the item entry. For example, attribute #1 column 504 stores the first attribute value. Accordingly, the attribute position is one for this attribute value.

At block 910, database engine server 22 traverses attribute map table 208 to find the associated attribute map entry. In particular, database engine server 22 matches the derived site ID, category ID and attribute position to the site IDs, category IDs and attribute positions in the attribute map entries. Once the associated attribute map entry is found, at block 910, database engine server 22 generates a translation for the attribute value. In particular, based on the associated attribute map entry, the translation of the attribute value includes (1) the attribute ID from attribute ID column 608, (2) the display position from display position column 610, (3) the display length from display length column 612 and (4) the search flag from search flag column 614.

Further, database engine server 22 translates the attribute value by traversing generic attribute table 202 to find the associated attribute entry. In particular, database engine server 22 matches the site ID and the attribute ID from the attribute map entry. Once the associated attribute entry is found, database engine server 22 determines (1) the attribute name from attribute name column 305 and (2) the attribute type from attribute type column 307. At decision block 912, database engine server 22 checks to see if this is the last attribute for this item entry in attribute value table 206. If this is not the last attribute, database engine server 22, returning to block 908, determines the attribute position of the next attribute in the item category based on its location therein. If this is the last attribute, at decision block 912, database engine server 22 checks to see if this is the last entry, at block 914. If this is not the last entry, database engine server 22, at block 904, retrieves the next item entry. If this is the last entry, database engine server 22, at block 916, outputs the translation for the attribute values for each item that matched. In one embodiment, this output is formatted into a display interface, as illustrated in FIG. 7.

Figure 10:
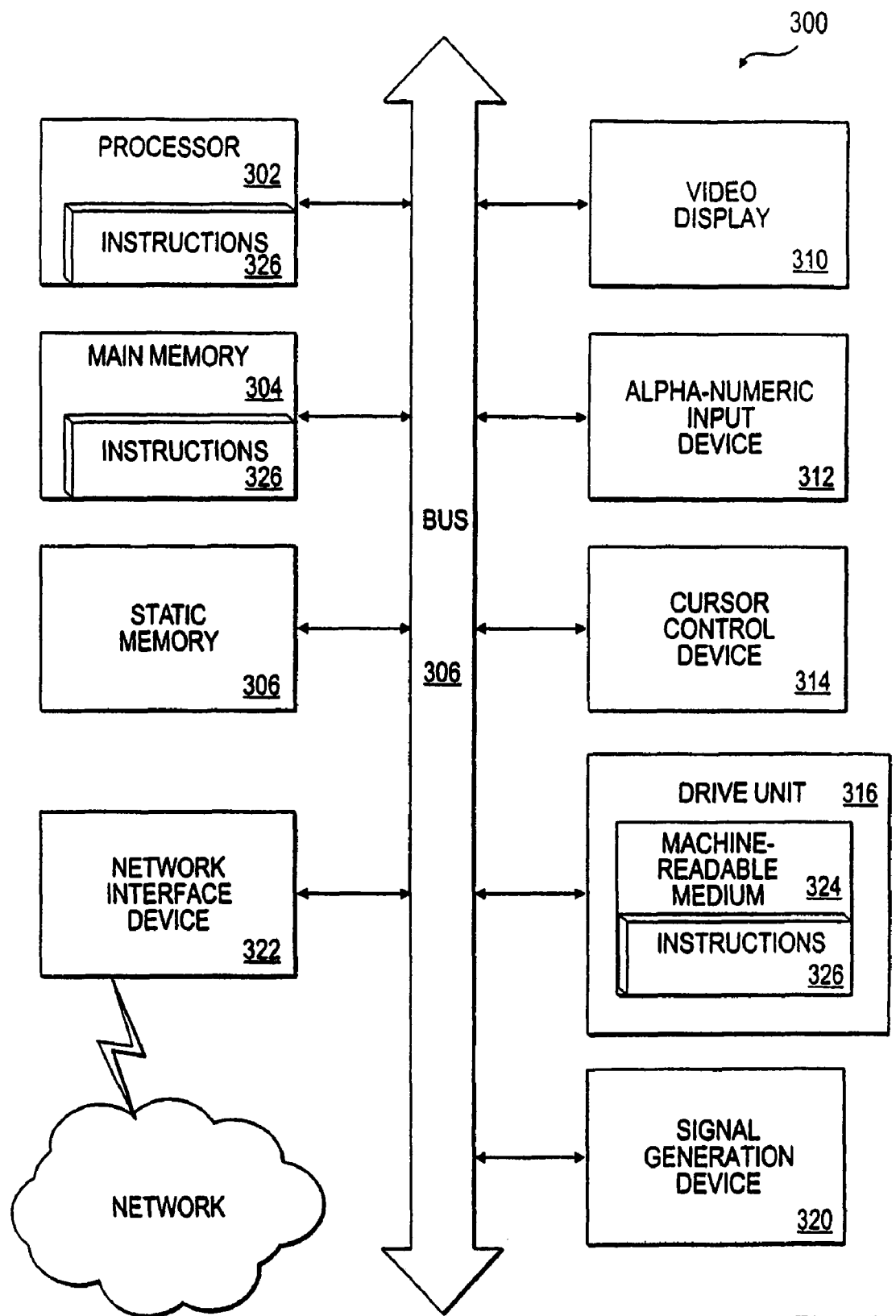
FIG. 10 is a diagrammatic representation of a machine used in conjunction with systems and methods according to embodiments of the present invention.

FIG. 10 shows a diagrammatic representation of machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g. a keyboard), a cursor control device 314 (e.g. a mouse), a disk drive unit 316, a signal generation device 320 (e.g. a speaker) and a network interface device 322

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system for storing multiple items across different categories in a database have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented system for storing and retrieving item listings, said computer-implemented system comprising:
    a database component for storing a plurality of item listings, each of said item listings having associated attributes, each of said item listings assigned a category from a plurality of categories, at least one attribute being shared by at least two item listings having mutually exclusive categories;
    a search server, said search server receiving a set of requested attributes for a requested item in a requested category; and
    a database engine server coupled to said search server and said database component, said database engine server returning a set of item listings from said database component having said requested category and said set of requested attributes.

2. The system as set forth in claim 1, wherein the database component includes a data structure that associates an identifier of an attribute with an entry selected from a group of entries comprising an attribute name, attribute type and a site identifier.

3. The system as set forth in claim 1, wherein the database component includes a data structure that stores the items, and associated attributes, represented in the plurality of categories.

4. The system as set forth in claim 1, wherein the database component includes a data structure that translates attributes associated with an item listing dependent on a category assigned to said item listing.

5. The system as set forth in claim 1, wherein the database component includes a data structure that defines allowable values for each attribute.

6. A method for searching a database of item listings implemented by a processor executing instructions, said method comprising:
    receiving a set of search parameters in a search server, said search parameters including at least a first requested attribute and a requested category of item listings to be searched;
    accessing a said database of item listings with a database engine server, said database engine server selectively removing from consideration item listings having assigned categories that do not match said requested category to determine a set of item listings that include an attribute matching the requested attribute; and
    presenting the set of item listings to a user.

7. The method for searching said database of item listings as set forth in claim 6, including:
    validating the first requested attribute against valid attribute values stored within a data structure.

8. The method for searching said database of item listings as set forth in claim 6, including:
    utilizing a translation data structure to determine category specific display characteristics of the attribute selected from a group comprising display position, display length, and attribute position.

9. The method for searching said database of item listings as set forth in claim 6, wherein the item listings searched include item listings from a plurality of different sites.

10. The method for searching said database of item listings as set forth in claim 9, wherein said database engine server further selectively removes from consideration item listings from a different site not associated with said search server.

11. A computer-implemented system for storing item listings in a database, computer-implemented system comprising:
- a memory;
- at least one processor coupled to the memory;
- an interface module to receive, using the at least one processor, data for said database, said data comprising item listings; and
- a database component, said database component including:
  - a data structure that stores a plurality of item listings, each item listing having one or more attributes and an assigned category from a plurality of categories, and at least one attribute being shared by item listings having different assigned categories of the plurality of categories; and
  - a data structure that translates attributes being shared by the plurality of categories into category specific attributes.

12. The system for storing item listings in said database as set forth in claim 11, wherein said database component further includes a data structure that defines valid values for each attribute.

13. The system for storing item listings in said database as set forth in claim 12, wherein the valid values for each attribute are represented by a minimum and maximum value.

14. The system for storing item listings in said database as set forth in claim 12, wherein a valid value of each attribute is represented by one or more specific values.

15. The system for storing item listings in said database as set forth in claim 11, wherein said database component further includes a data structure that associates an identifier of an attribute with a name and a type of the attribute.

16. A method for storing item listings in a database, the method comprising:
- receiving a data entry for a first item with a first attribute, said first item associated with a first category of a plurality of categories;
- validating the first attribute, using one or more processors, of the item against a first data structure containing valid values for the first attribute; and
- storing the first attribute and first category for said first item in a second data structure containing item listings from a plurality of different categories, said first attribute being shared by said first category and at least one other category in said plurality of categories.

17. The method for storing item listings in said database as set forth in claim 16, wherein the valid values for the first attribute include a minimum and maximum value.

18. The method for storing item listings in said database as set forth in claim 16, wherein the valid values for the first attribute include a plurality of specific values.

19. The method for storing item listings in said database as set forth in claim 16, including storing attribute mapping information in a third data structure, wherein the third data structure includes a plurality of elements selected from a group comprising:
- attribute position;
- attribute display length;
- attribute display position;
- attribute identification; and
- a search flag.

20. The method as set forth in claim 19, wherein the mapping information is used to determine how an attribute will be displayed when used within a particular category of said plurality of categories.

* * * * *

UNITED STATES PATENT AND TRADEMARK OFFICE
CERTIFICATE OF CORRECTION

| | | |
|---|---|---|
| PATENT NO. | : 8,140,510 B2 | Page 1 of 1 |
| APPLICATION NO. | : 12/416088 | |
| DATED | : March 20, 2012 | |
| INVENTOR(S) | : Hsiaozhang B. Wang | |

It is certified that error appears in the above-identified patent and that said Letters Patent is hereby corrected as shown below:

On page 3, under "Other Publications", in column 2, line 30, delete "Bulletin,," and insert -- Bulletin, --, therefor.

On page 3, under "Other Publications", in column 2, line 65, delete "eMarketpla"," and insert -- eMarketplace", --, therefor.

On page 4, under "Other Publications", in column 1, line 2, delete "Management.," and insert -- Management, --, therefor.

In column 7, line 41, after "322" insert -- . --.

In column 8, line 44, in Claim 6, delete "a said" and insert -- said --, therefor.

Signed and Sealed this
Twenty-eighth Day of August, 2012

David J. Kappos
*Director of the United States Patent and Trademark Office*